US008177617B1

(12) United States Patent
Nottke

(10) Patent No.: US 8,177,617 B1
(45) Date of Patent: May 15, 2012

(54) THREE CARD VIDEO POKER

(76) Inventor: Timothy G. Nottke, Toledo, OH (US)

( * ) Notice: Subject to any disclaimer, the term of this patent is extended or adjusted under 35 U.S.C. 154(b) by 458 days.

(21) Appl. No.: 12/368,319

(22) Filed: Feb. 10, 2009

Related U.S. Application Data

(60) Provisional application No. 61/029,043, filed on Feb. 15, 2008.

(51) Int. Cl.
*A63F 13/00* (2006.01)

(52) U.S. Cl. .......................................... 463/13; 273/292

(58) Field of Classification Search .................... 463/13, 463/25, 20, 42; 273/292
See application file for complete search history.

(56) References Cited

U.S. PATENT DOCUMENTS

| | | | |
|---|---|---|---|
| 5,042,809 | A | 8/1991 | Richardson |
| D395,463 | S | 6/1998 | Scott et al. |
| 5,823,873 | A | 10/1998 | Moody |
| 6,098,985 | A | 8/2000 | Moody |
| 6,201,532 | B1 | 3/2001 | Tode et al. |
| 6,248,016 | B1 | 6/2001 | Walker et al. |
| 6,332,839 | B2 | 12/2001 | Walker et al. |
| 6,443,456 | B1 | 9/2002 | Gajor |
| 6,474,645 | B2 | 11/2002 | Tarantino |
| 6,506,118 | B1 | 1/2003 | Baerlocher et al. |
| 6,511,068 | B1 | 1/2003 | Sklansky et al. |
| 6,514,141 | B1 | 2/2003 | Kaminkow et al. |
| 6,561,898 | B2 | 5/2003 | Moody |
| 6,698,759 | B2 | 3/2004 | Webb et al. |
| 6,773,012 | B1 | 8/2004 | French |
| 6,857,957 | B2 | 2/2005 | Marks et al. |
| 6,857,961 | B2 | 2/2005 | Soltys et al. |
| 6,964,612 | B2 | 11/2005 | Soltys et al. |
| 6,991,538 | B2 | 1/2006 | Cannon |
| 6,991,544 | B2 | 1/2006 | Soltys et al. |
| 7,022,016 | B2 | 4/2006 | Wood et al. |
| 7,104,544 | B2 | 9/2006 | Reiner et al. |
| 7,118,111 | B1 | 10/2006 | Altomare |
| 7,137,628 | B2 | 11/2006 | Moody |
| 7,156,397 | B2 | 1/2007 | Moody et al. |
| 7,165,770 | B2 | 1/2007 | Snow |
| 7,195,243 | B2 | 3/2007 | Kenny et al. |
| 7,222,852 | B2 | 5/2007 | Soltys et al. |
| 7,222,856 | B2 | 5/2007 | Dodge |
| 7,222,857 | B2 | 5/2007 | Moody |
| 7,222,858 | B2 | 5/2007 | Moody |
| 7,246,799 | B2 | 7/2007 | Snow |
| 7,247,091 | B2 | 7/2007 | Moody |
| 7,247,092 | B2 | 7/2007 | Jarvis et al. |
| 7,249,765 | B2 | 7/2007 | Durbin |
| 7,264,243 | B2 | 9/2007 | Yoseloff et al. |
| 7,325,806 | B1 | 2/2008 | Feola |
| 7,331,579 | B2 | 2/2008 | Snow |
| 7,367,563 | B2 | 5/2008 | Yoseloff et al. |
| 7,380,795 | B2 | 6/2008 | Novellie et al. |
| 7,389,990 | B2 | 6/2008 | Mourad |
| 7,390,256 | B2 | 6/2008 | Soltys et al. |
| 7,410,172 | B1 | 8/2008 | Muskin |
| 7,422,215 | B2 | 9/2008 | Campbell et al. |

(Continued)

*Primary Examiner* — Brook Kebede
(74) *Attorney, Agent, or Firm* — Donald K. Wedding

(57) ABSTRACT

A poker game which comprises generating a row-column grid or matrix of three cards by three cards, a total of nine cards, such that there are three horizontal rows of poker hands and three vertical columns of poker hands a total of six poker hands. The nine cards and the replacement cards may be dealt or generated from a special or custom deck or a standard deck of 52 cards. Multiple standard 52 decks may be used.

3 Claims, 10 Drawing Sheets

U.S. PATENT DOCUMENTS

| | | | | |
|---|---|---|---|---|
| 7,427,234 | B2 | 9/2008 | Soltys et al. | |
| D578,575 | S | 10/2008 | Clark et al. | |
| D579,056 | S | 10/2008 | Murphy et al. | |
| 7,448,626 | B2 | 11/2008 | Fleckenstein | |
| 7,451,987 | B1 | 11/2008 | Feola | |
| 7,458,582 | B2 | 12/2008 | Snow et al. | |
| 7,481,432 | B2 | 1/2009 | Feola | |
| 2002/0187823 | A1 * | 12/2002 | Khal | 463/13 |
| 2003/0038425 | A1 | 2/2003 | Tarantino | |
| 2004/0219970 | A1 | 11/2004 | Tarantino | |
| 2005/0026668 | A1 | 2/2005 | Tarantino | |
| 2005/0054409 | A1 | 3/2005 | Cannon | |
| 2006/0194628 | A1 | 8/2006 | Novellie | |
| 2006/0281513 | A1 | 12/2006 | Kirkpatrick | |
| 2006/0287058 | A1 | 12/2006 | Resnick et al. | |
| 2007/0126180 | A1 | 6/2007 | Dodge | |
| 2007/0152402 | A1 * | 7/2007 | Schmidt et al. | 273/292 |
| 2007/0155500 | A1 | 7/2007 | Honour | |

* cited by examiner

THREE CARD VIDEO POKER

RELATED APPLICATION

This application claims priority under 35 U.S.C. 119(e) for U.S. Provisional Application Ser. No. 61/029,043 filed Feb. 15, 2008.

FIELD OF INVENTION

This invention relates to a three card poker game wherein a plurality of unique poker hands are generated for a player and a dealer, allowing a player to receive multiple payouts before and after the player's hands are compared to the dealer's hand.

RELATED PRIOR ART

The following references disclose a video poker game wherein multiple hands are dealt per game for a single player: U.S. Pat. Nos. 6,098,985 (Moody), 6,474,645 (Tarantino), 6,511,068 (Sklansky et al.), 6,561,898 (Moody), 7,247,092 (Jarvis et al.), U.S. Patent Application Publication Nos. 2003/0038425 (Tarantino), 2004/0219970 (Tarantino), 2005/0026668 (Tarantino), and 2006/0194628 (Novellie), all incorporated herein by reference.

U.S. Patent Application Publication 2006/0287058 (Resnick et al.) discloses a gaming system with multiple game types, and is incorporated herein by reference.

U.S. Patent Application Publication 2007/0155500 (Honour) discloses a multiple player video poker game, and is incorporated herein by reference.

The following references disclose an improved poker game: U.S. Pat. Nos. 7,137,628 (Moody), 7,222,856 (Dodge), 7,222,857 (Moody), 7,222,858 (Moody), U.S. Patent Application Publication 2006/0281513 (Kirkpatrick), all incorporated herein by reference.

The following references disclose a gaming device with cards that impact the outcome of the game: U.S. Patent Application Publication 2005/0054409 (Cannon), and U.S. Pat. No. 6,857,957 (Marks et al.), both incorporated herein by reference.

The following prior art references disclose electronic or computerized gaming devices: U.S. Pat. Nos. 5,042,809 (Richardson), 6,248,016 (Walker et al.), 6,332,839 (Walker et al.), 7,022,016 (Wood et al.), 7,222,857 (Moody), and 7,247,091 (Moody). U.S. Design Pat. No. D395,463 (Scott et al.), and U.S. Pat. No. 6,201,532 (Tode et al.) discloses an electronic gaming device with a deck mounted touch screen, all incorporated herein by reference.

The following prior art references disclose a three card poker game where the player's hand is compared to a dealer hand: U.S. Pat. Nos. 6,698,759 (Webb et al.), 6,773,012 (French), 7,165,770 (Snow), and 7,264,243 (Yoseloff et al.), all incorporated herein by reference.

SPECIFIC EMBODIMENTS OF THE INVENTION

In accordance with this invention, there is provided a poker game which comprises generating a row-column grid or matrix of three cards by three cards, a total of nine cards, such that there are three horizontal rows of poker hands and three vertical columns of poker hands, a total of six poker hands. The dealer receives three cards face down.

This invention relates to a multiple handed video poker game wherein a single player is dealt nine cards face up from a deck of cards, for example, a standard 52 card deck. The cards are arranged in a matrix of three rows and three columns, with three cards per row and three cards per column, a total of nine cards. The dealer receives three cards face down.

A hand is defined as any row of three cards or any column of three cards. The player may collect on any number of hands one to six.

A typical game comprises the following steps:

1. The player makes an ante bet and an optional pair plus bet equal to the ante bet.
2. The dealer or computer deals the cards face up in a three card by three card matrix or grid for the player and deals three dealer cards face down.
3. The player decides to bet or fold any of the six hands that were dealt to him/her. If the player decides to play a specific hand, then he/she must place an equal bet on the bet hand next to the ante bet. If the player decides to fold the hand, he/she surrenders the ante bet.
4. The dealer or computer reveals the dealer cards. The dealer needs a queen or better to qualify. If the dealer's hand does not have a queen, then the player will win even money on the ante bet and the play will be returned to the player. If the dealer's hand has a queen, then the player's hands will be compared to the dealer's hand, with the higher hand or hands winning according to a pre-determined pay scale.

An example of a pre-determined pay scale for a winning hand is shown in Table III.

TABLE III

| Pre-determined Pay Scale | |
|---|---|
| Winning hand | Payout |
| Straight Flush | 40-1 |
| Three of a kind | 30-1 |
| Straight | 6-1 |
| Flush | 3-1 |
| Pair | 1-1 |
| High Card | 1-1 |

5. If the player has the higher poker hand, then the ante and bet will both pay even money.
6. If the dealer has the higher poker hand, then the ante and bet will both lose.
7. If the player and dealer hands tie, then the ante and bet will be returned to the player.
8. If the player made the ante bet and has a straight or higher, then the player will receive an ante bonus, regardless of the value of the dealer's hand.

An example of a pre-determined pay scale for a pairs plus bonus hand is shown in Table IV.

TABLE IV

| Pairs Plus Bonus Hand Pre-determined Pay Scale | |
|---|---|
| Ante Bonus | Payout |
| Straight Flush | 4-1 |
| Three of a kind | 3-1 |
| Straight | 1-1 |

9. The pair plus bet will pay entirely based on the poker value of the player's hand and is not subject to the dealer qualifying or the player making a play bet.

Any or all of this game may be played with an actual dealer or with a computerized gaming console with a video screen such as a CRT or a flat screen display such as plasma, LCD, OLED, or LED. The game may be played on site at a legal game casino, in a non-gambling mode on-line over the internet, or off-line on a home computer using a disc such as a compact disc. The game could also be played as a game in gambling or non-gambling mode at a tavern, bar, or the like.

The gaming console may include a computer with a random number generator, and an integrated touch system to facilitate player input. The touch system may be an infrared (IR) touch system, capacitive touch system, resistive touch system, surface acoustical wave touch system, or an inductive touch system, mounted to the cabinet or to the bezel of the screen. A keyboard, cursor, or other input device may be used.

DETAILED DESCRIPTION OF THE DRAWINGS

Figure 1:
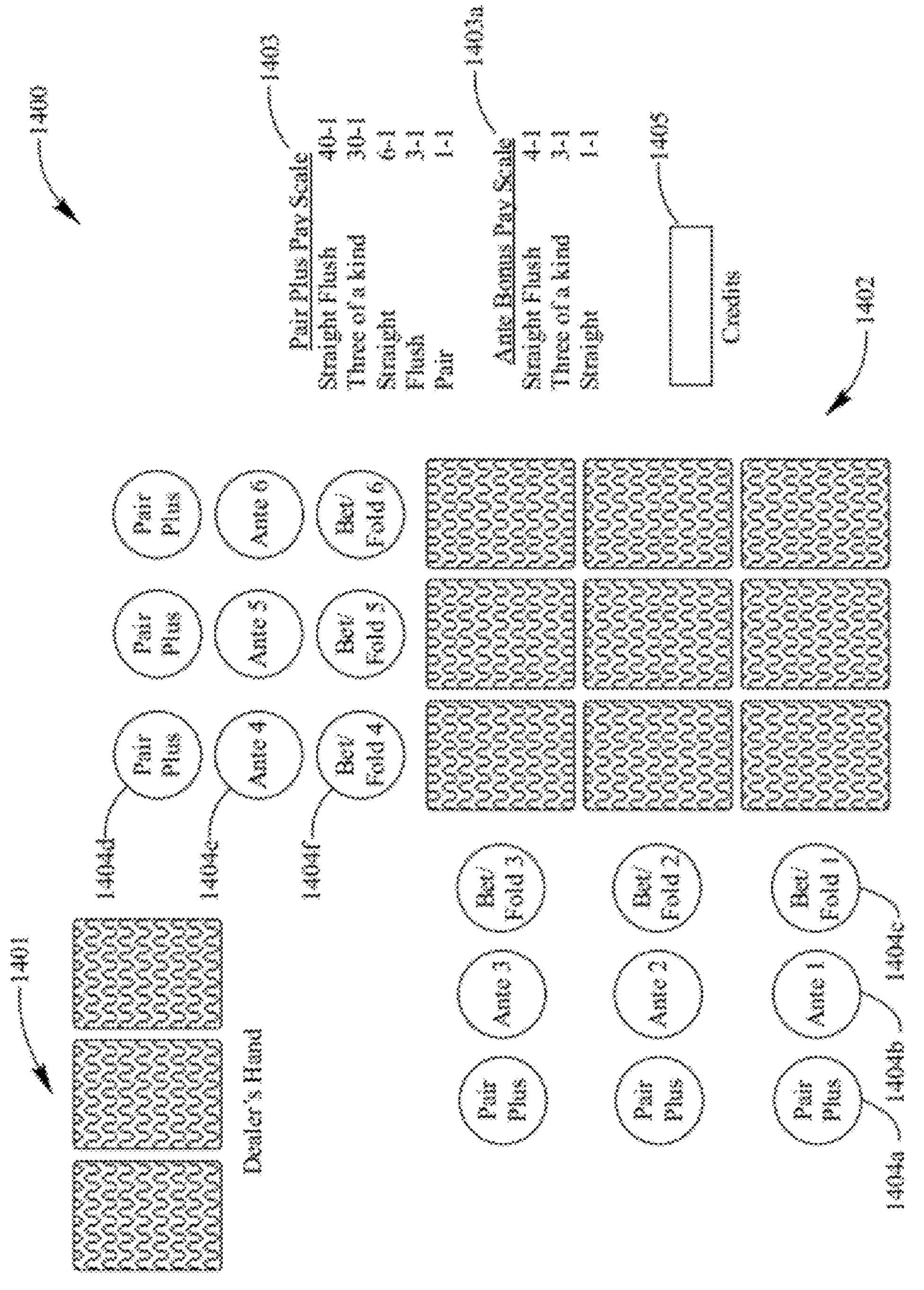
FIG. 1 is an example of the active game area.

FIG. 1 shows active game area 1400, the dealer's hand 1401, the three card by three card matrix 1402, a pre-determined pay scale 1403, an ante bonus pay scale 1403*a*, the pair plus wager circle for the first row 1404*a*, the ante wager circle for the first row 1404*b*, the bet or fold circle for the first row 1404*c*, the pair plus wager circle for the first column 1404*d*, the ante wager circle for the first column 1404*e*, the bet or fold circle for the first column 1404*f*, and the credit meter 1405.

Figure 1A:
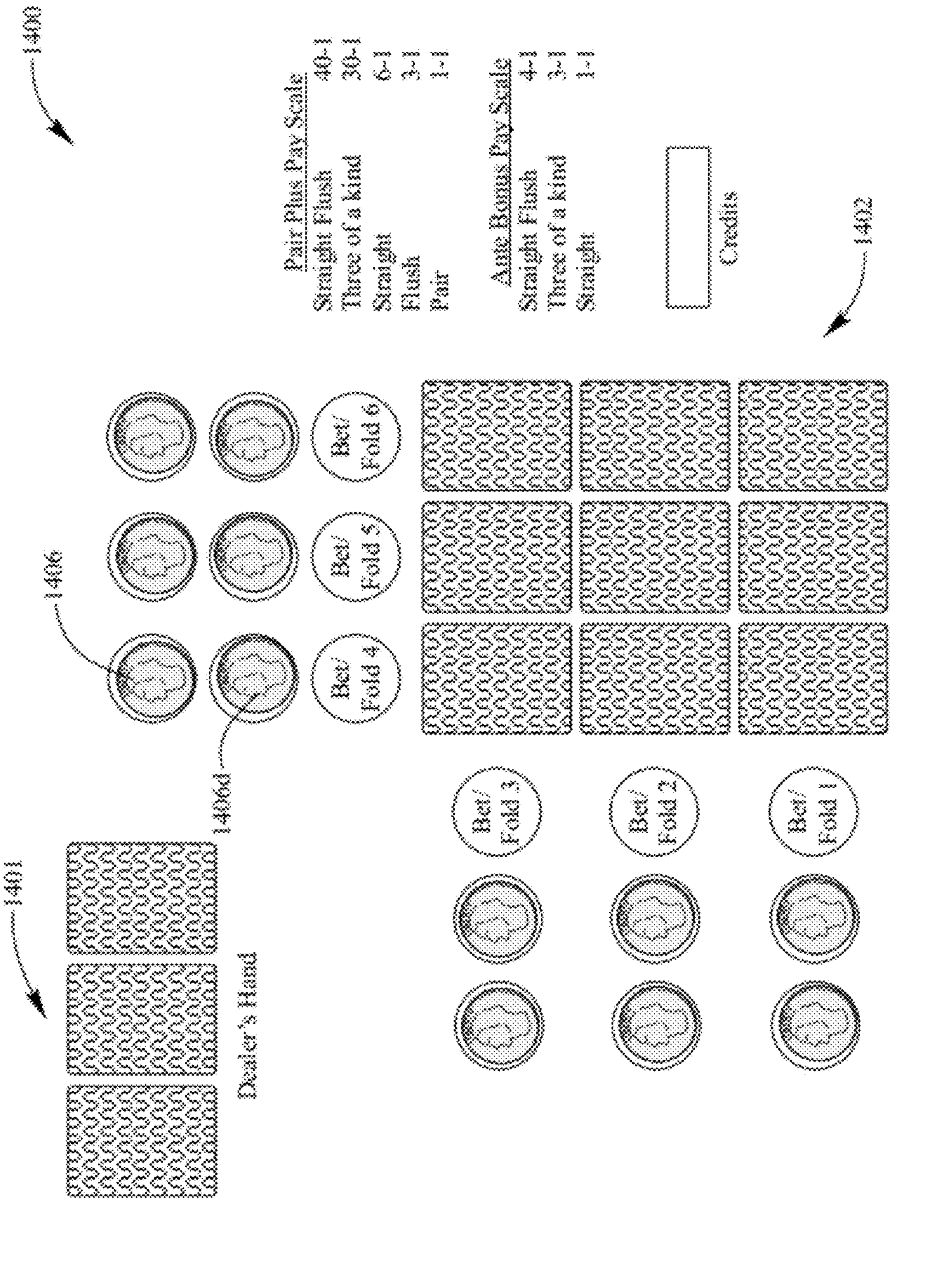
FIG. 1A shows an example of an ante and a pair plus wager.

FIG. 1A shows the active game area 1400 after the ante 1406*d* and pair plus wagers 1406 have been made on all of the rows and columns of possible hands. The dealer's hand 1401 has not yet been revealed and the three card by three card matrix 1402 has also not yet been revealed. The player begins the game by placing equal wagers on the ante circle 1406*d* and the optional pair plus circle 1406 for all of the possible hands.

Figure 1B:
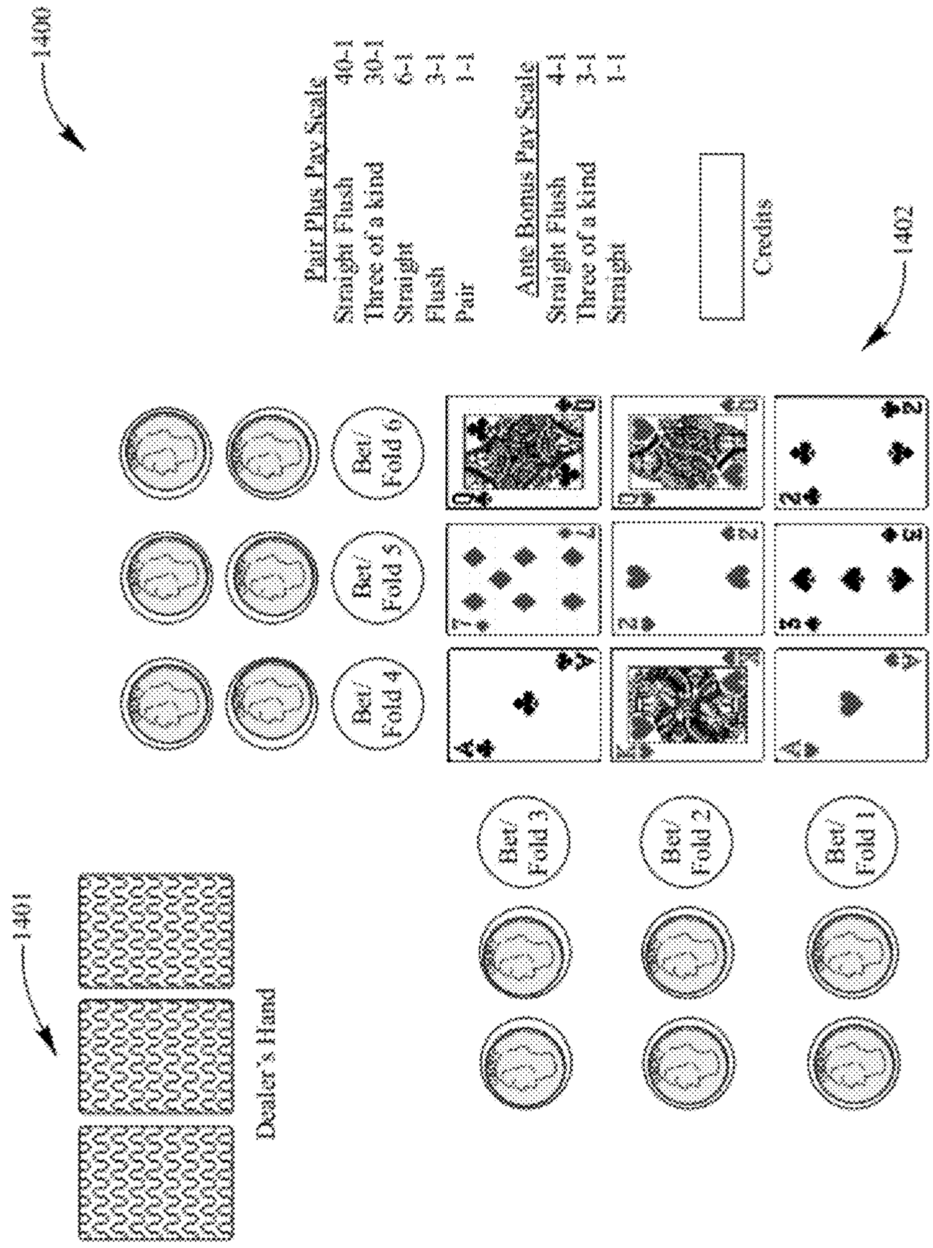
FIG. 1B shows the active game area after the deal.

FIG. 1B shows the active game area 1400 after a computer has used a random number generator to select cards for the player and displayed them face up in a three card by three card matrix 1402 giving the player a total of six possible hands to play. The computer also uses the random number generator to select three cards for the dealer and displays them face down.

The player must decide which hands will be folded and which will receive an additional bet. If the player folds a hand, by not placing an additional equal bet on it, then the ante is surrendered. If the player places an additional bet, it must be equal to the ante.

Figure 1C:
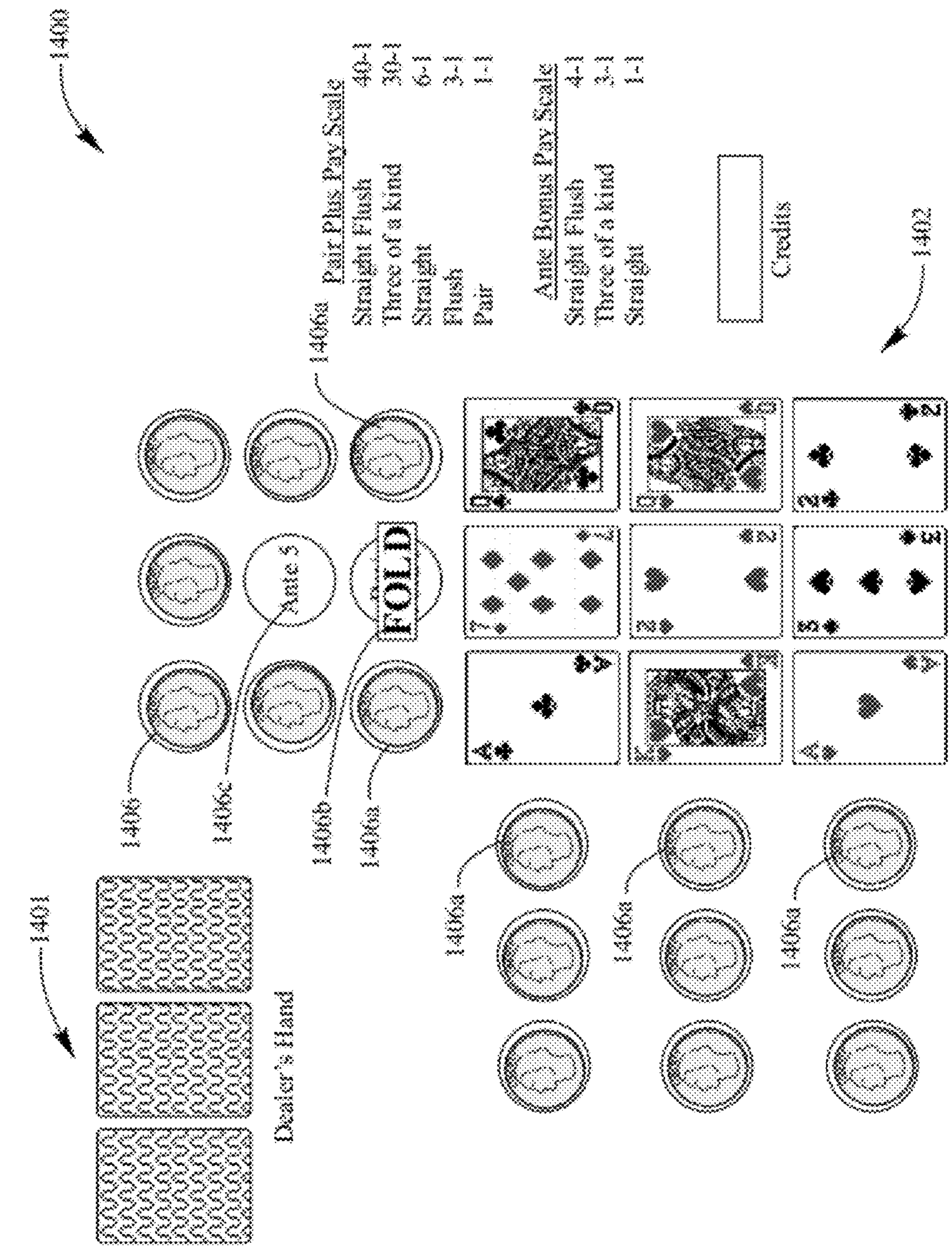
FIG. 1C shows a sample game being played after additional wagers and folding of a hand.

FIG. 1C shows the active game area 1400 after the player has selected which hands to fold 1406*b* and which hands to place an additional bet upon 1406*a*. The player has lost his ante bet 1406*c* for the hand in the second column.

Figure 1D:
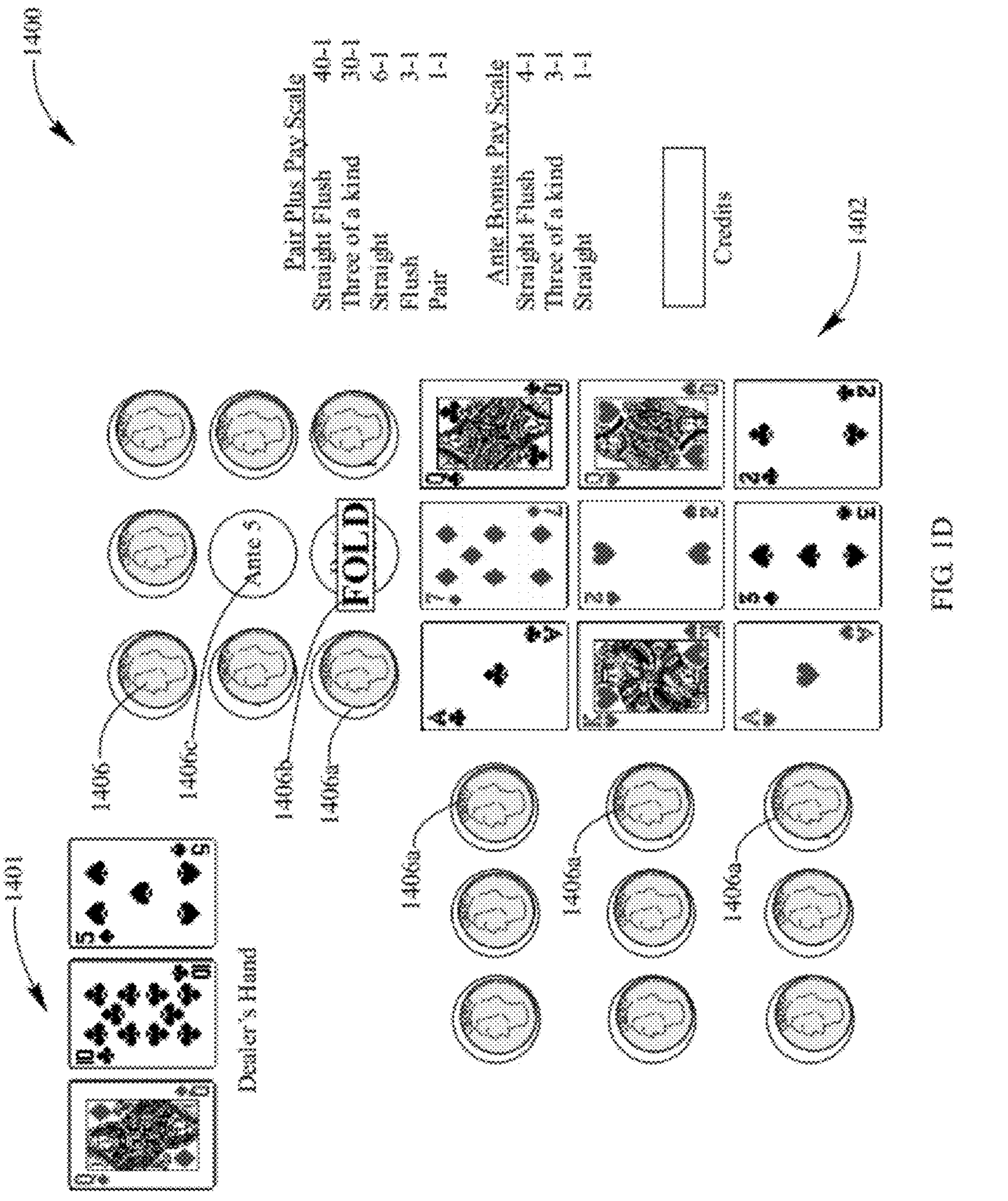
FIG. 1D shows the sample game after a dealers hand is dealt.

FIG. 1D shows the active game area 1400 after the dealer's hand 1401 has been revealed to the player. The dealer has a queen and the hand qualifies to be compared to the hands that the player has remaining 1402.

Figure 1E:
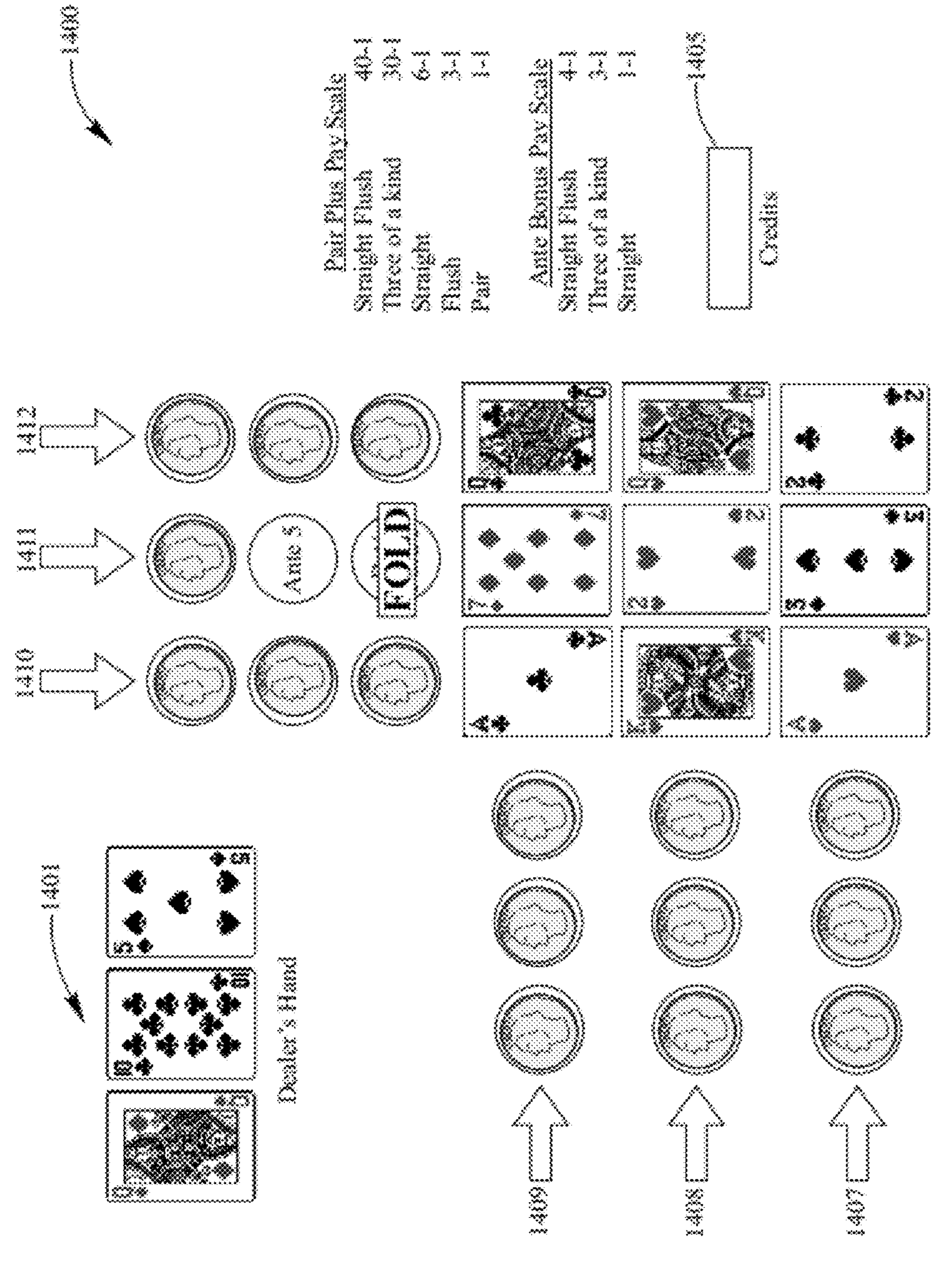
FIG. 1E shows the sample hand after the dealer's hand has been revealed.

FIG. 1E shows the active game are 1400 each row and column are compared to the dealer's hand 1401. The dealer's hand 1401 only has a high card. Row one 1407 is compared to the dealer's hand 1401 and the player has a straight, winning the ante and the bet. Row two 1408 is compared to the dealer's hand 1401 and the player has a flush, winning the ante and the bet. Row three 1409 is compared to the dealer's hand 1401 and the player has high cards, winning the ante and the bet. Column one 1410 is compared to the dealer's hand 1401 and the player has a pair of aces, winning the ante and the bet. Column two 1411 was folded, and the player loses the ante and the bet. Column three 1411 is compared to the dealer's hand 1401 and the player has a pair of queens, winning the ante and the bet.

After each row and column is analyzed the computer adds the appropriate amount of money to the credit meter 1405.

Figure 1F:
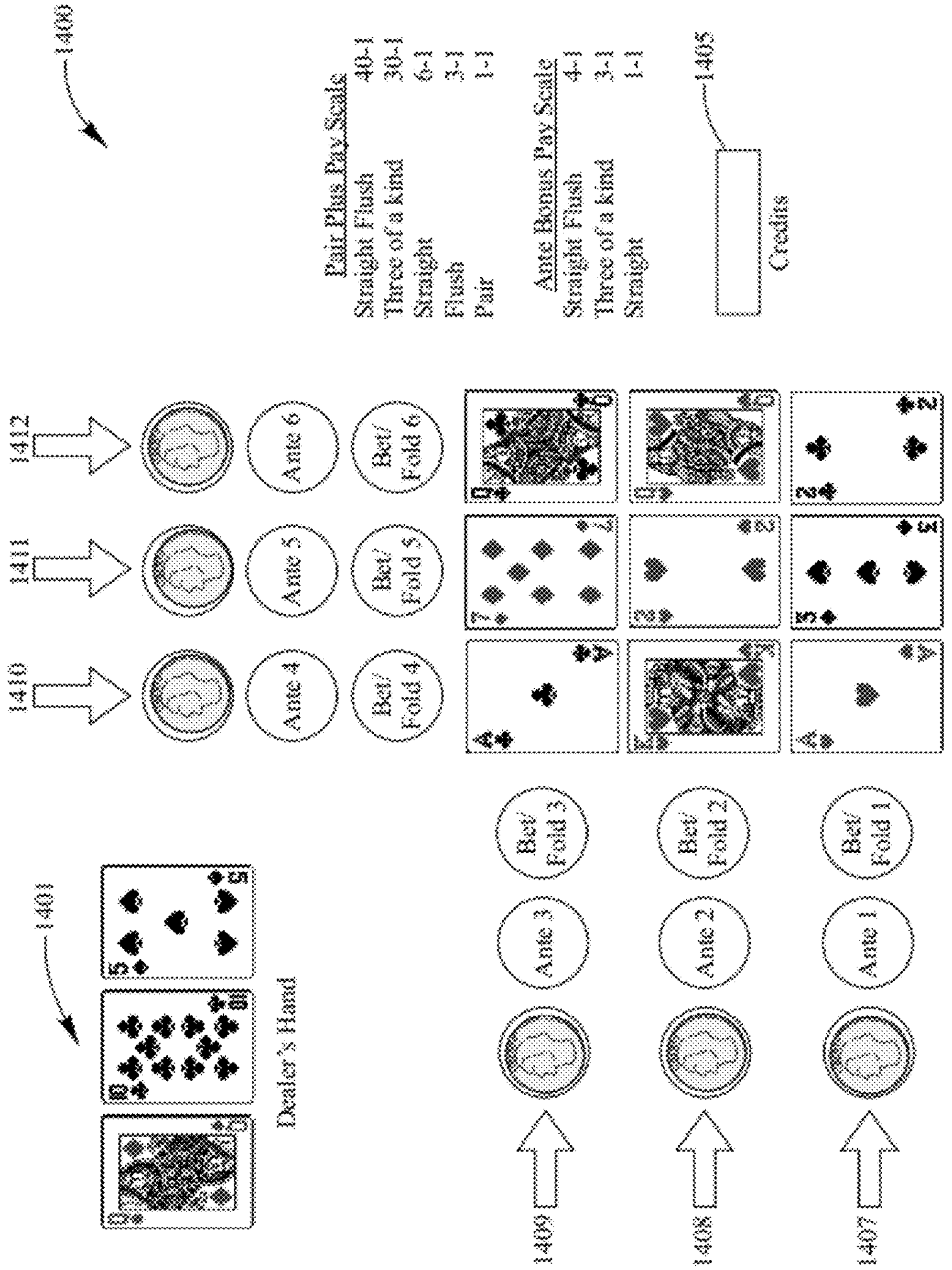
FIG. 1F shows the comparison of the dealer's hand to the player's hands.

FIG. 1F shows the active game area 1400 with the pre-determined pair plus payouts as follows: row one, wins 6 to 1; row two, wins 3 to 1; row three, loses since the hand only has a high card; column one, wins 1 to 1; column two, loses with only a high card; column three wins 1 to 1. The computer only analyzes these hands according to standard three card poker rules, and does not compare the hands to the dealer's hand 1401. The payouts are calculated and the computer adds the appropriate amount to the credit meter 1405.

Figure 2:
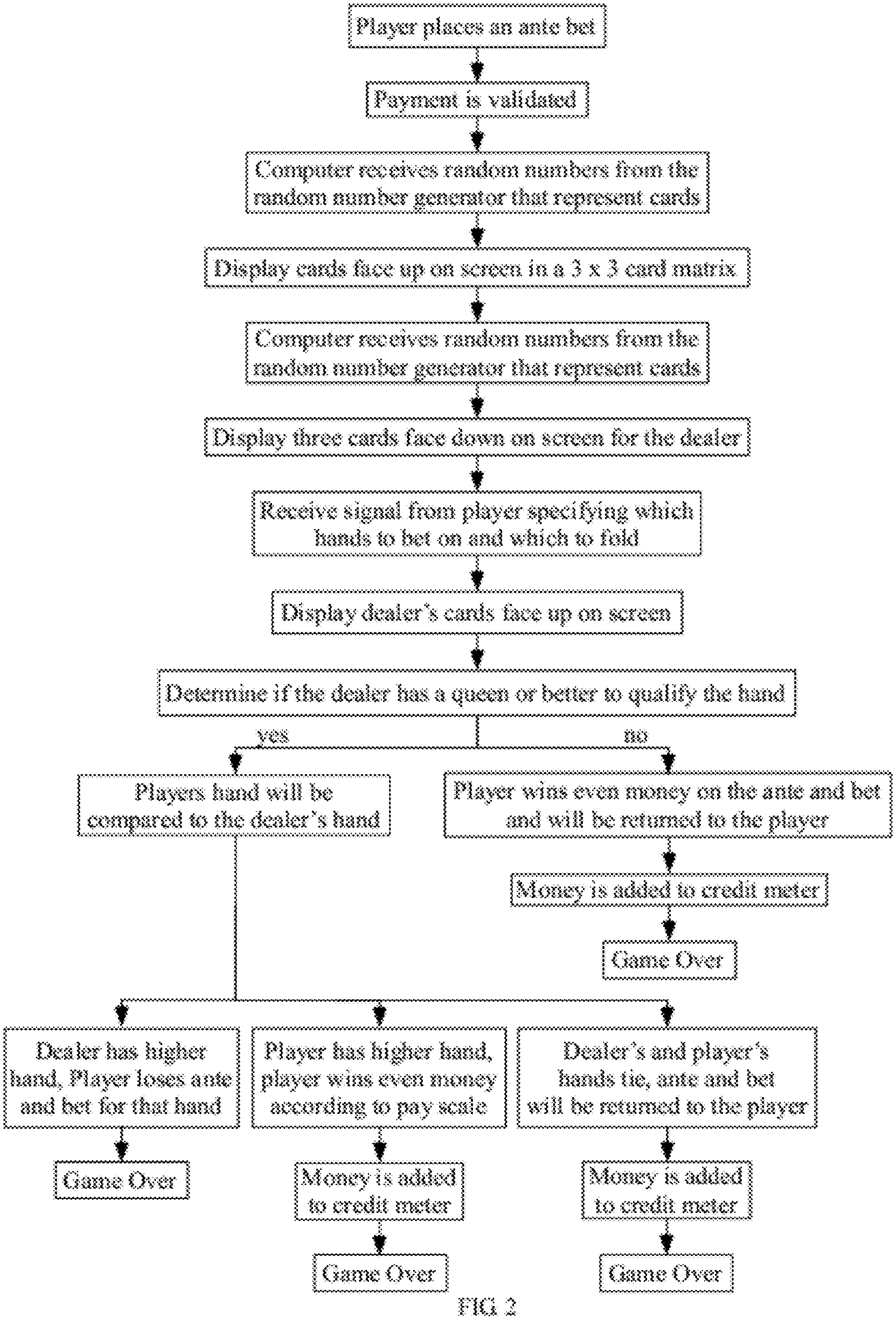
FIG. 2 shows a block diagram of the game with only an ante bet.

FIG. 2 shows a block diagram of a typical game of three card poker as described in the present invention. In this embodiment, the player chooses not to play the pairs plus option.

The player places a bet, which is validated by the computer or dealer. The computer sends a signal to a random number generator. The random number generator sends nine numbers which represent cards to the computer. The computer displays the cards face up in a three card by three card matrix. The computer sends another signal to a random number generator. The random number generator sends three numbers which represent cards to the computer. The computer displays the cards face down in a three card row representing the dealer's three card poker hand. The player chooses which hands to bet on, by placing a bet on the hand, and which to fold. The computer displays the dealer's hand face up, and determines if the dealer's hand has a queen or better to qualify the hand.

If the dealer's hand has a queen or better then the player hands will be compared to the dealer's hand. If the dealer has a higher hand then the player loses the ante bet and the bet for the hand, and the game is over.

If the dealer's hand has a queen or better then the player hands will be compared to the dealer's hand. If the player has a higher hand then the player wins even money according to a pre-determined pay scale, money is added to a credit meter and the game is over.

If the dealer's hand has a queen or better then the player hands will be compared to the dealer's hand. If the dealer's hand and the player's hand tie then the ante and the bet are returned to the player, money is added to a credit meter and the game is over.

If the dealer's hand does not have a queen or better then the player wins even money on the ante and the bet. The ante and the bet are returned to the player, money is added to a credit meter and the game is over.

Figure 3:
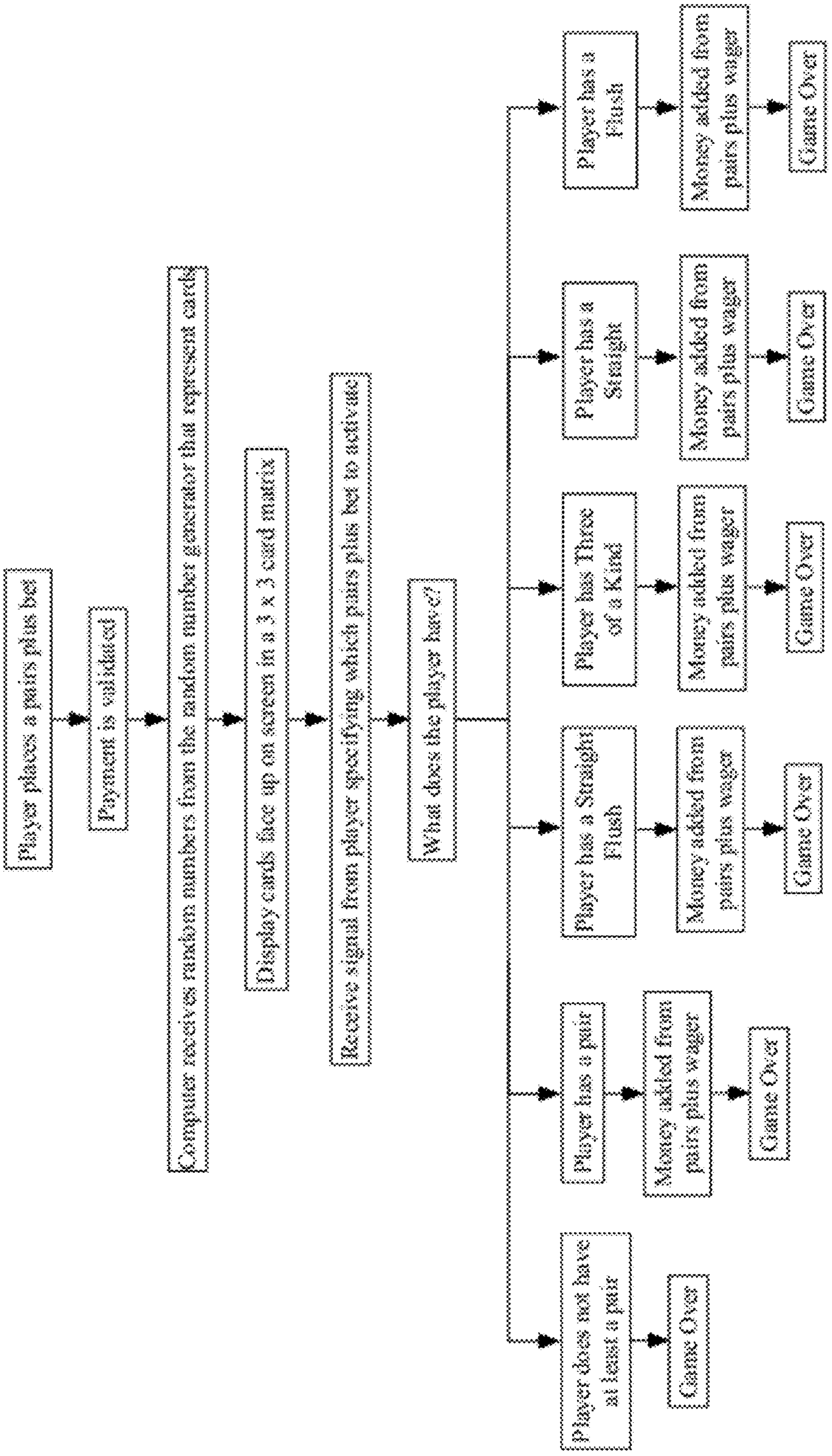
FIG. 3 shows a block diagram of the game with only a pairs plus bet.

FIG. 3 shows a block diagram of a typical game of three card poker as described in the present invention, where only the pairs plus option is played.

The player places a pairs plus wager, which is validated by the computer or dealer. The computer sends a signal to a random number generator. The random number generator sends nine numbers which represent cards to the computer. The computer displays the cards face up in a three card by three card matrix. The player chooses which pairs plus bet to activate.

The computer determines the proper payout for each of the hands that had a bet placed upon them, and pays accordingly.

Figure 4:
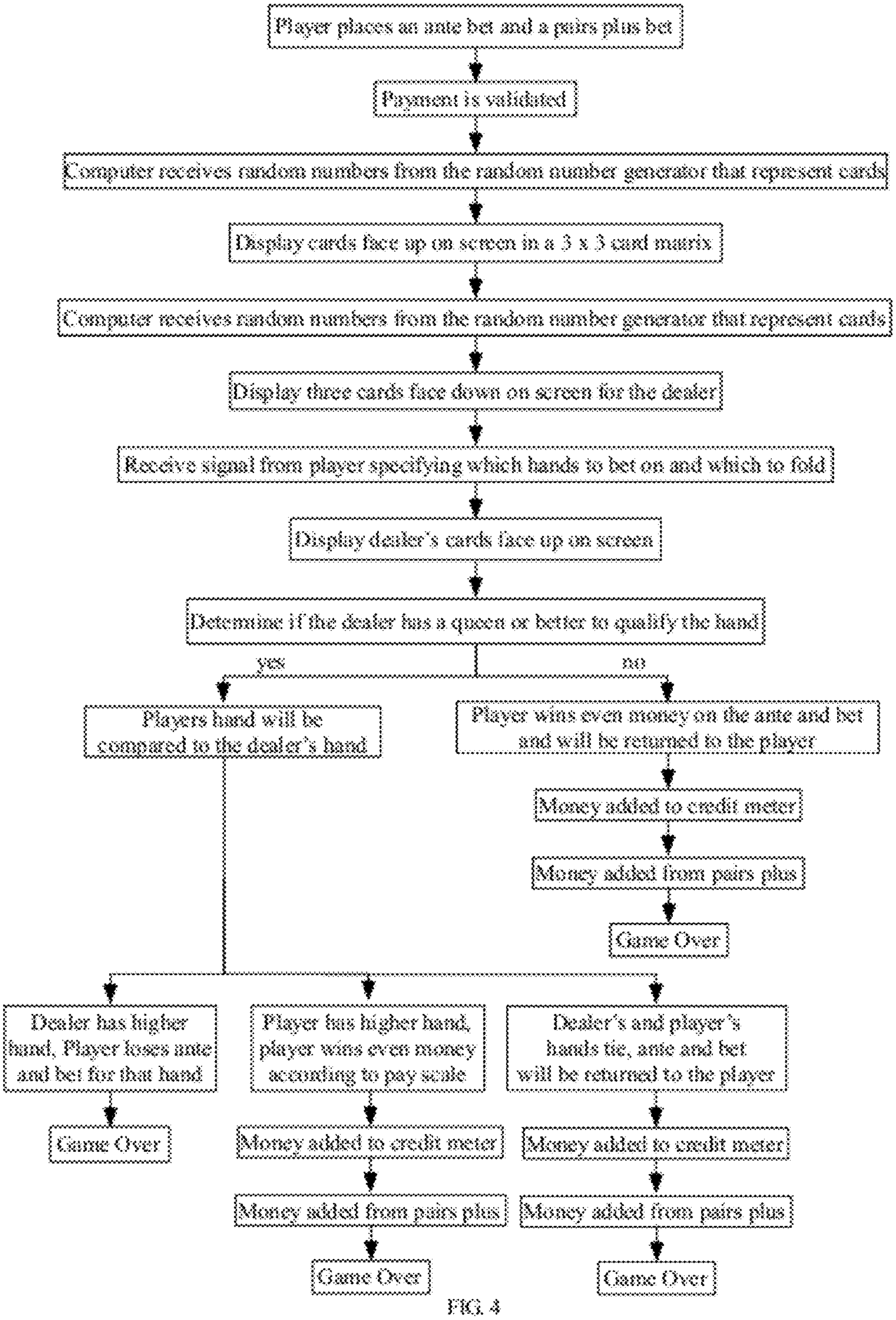
FIG. 4 shows a block diagram of the game with an ante bet and a pairs plus bet.

FIG. 4 shows a block diagram of a typical game of three card poker as described in the present invention. In this embodiment, the player chooses to play the pairs plus option.

The player places a bet, and a pairs plus wager, which is validated by the computer or dealer. The computer sends a signal to a random number generator. The random number generator sends nine numbers which represent cards to the computer. The computer displays the cards face up in a three card by three card matrix. The computer sends another signal to a random number generator. The random number generator sends three numbers which represent cards to the computer. The computer displays the cards face down in a three card row representing the dealer's three card poker hand. The player chooses which hands to bet on, by placing a bet on the hand and which to fold. The computer displays the dealer's hand face up, and determines if the dealer's hand has a queen or better to qualify the hand.

If the dealer's hand has a queen or better then the player hands will be compared to the dealer's hand. If the dealer has a higher hand then the player loses the ante bet and the bet for the hand and the game is over.

If the dealer's hand has a queen or better then the player hands will be compared to the dealer's hand. If the player has a higher hand then the player wins even money according to a pre-determined pay scale, money is added to a credit meter, if the hand has a Straight Flush, Three of a kind, or a Straight, the pairs plus bonus is paid accordingly, and the game is over.

If the dealer's hand has a queen or better then the player hands will be compared to the dealer's hand. If the dealer's hand and the player's hand tie then the ante and the bet are returned to the player, money is added to a credit meter and the game is over.

If the dealer's hand does not have a queen or better then the player wins even money on the ante and the bet. The ante and the bet are returned to the player, money is added to a credit meter and the game is over.

SUMMARY

The foregoing description of various embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A video game method for playing three card video poker using a computer, a random number generator, and a video display screen wherein the computer receives random numbers representing cards from the random number generator and displays the cards on the video display screen, which comprises:

randomly generating a single dealer poker hand of three cards with a random number generator;

displaying the dealer hand face down on the video display screen with the computer;

randomly generating a matrix of three cards by three cards with the random number generator to form three vertical player poker hands and three horizontal player poker hands;

displaying said six player poker hands face up on the video display screen with the computer;

placing a bet or folding each of the six player hands with a signal to the computer;

displaying the dealer hand face up;

and awarding with the computer a payout for each winning poker hand compared to the dealer poker hand.

2. The video poker game method of claim 1 wherein the three card by three card matrix is generated from a standard deck of 52 cards.

3. The video poker game method of claim 1 wherein the three card by three card matrix is generated from a multiple deck of cards.

* * * * *